March 29, 1966 V. R. DUNN 3,242,948
ADJUSTABLE PIPE JACKET
Filed Nov. 29, 1963 2 Sheets-Sheet 2
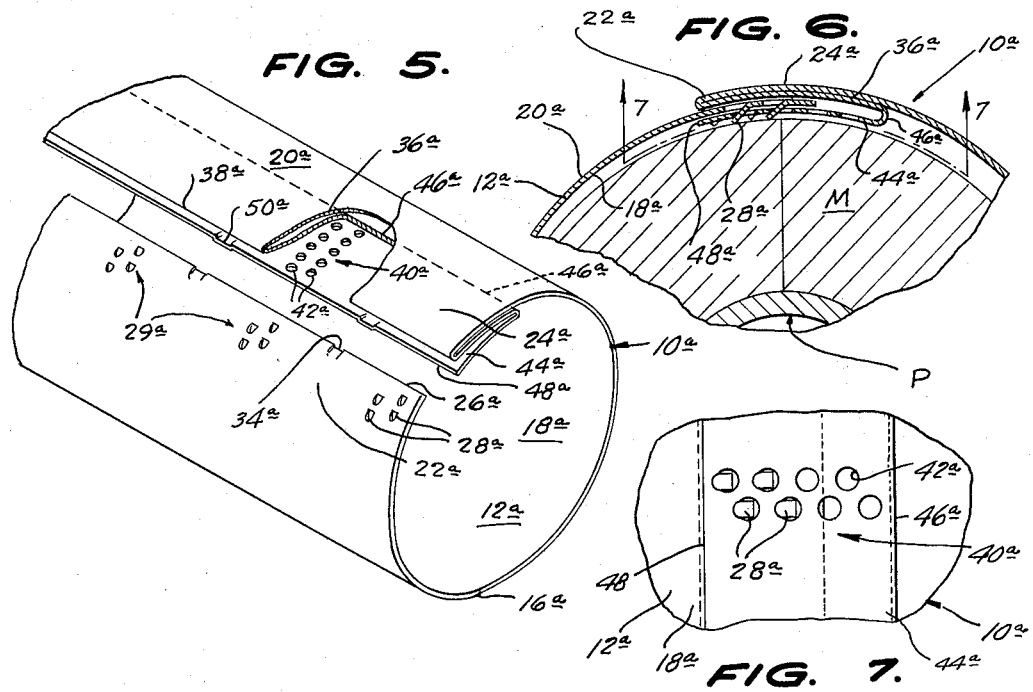
INVENTOR.
VICTOR R. DUNN,
BY
McMorrow, Berman & Davidson
ATTORNEYS.

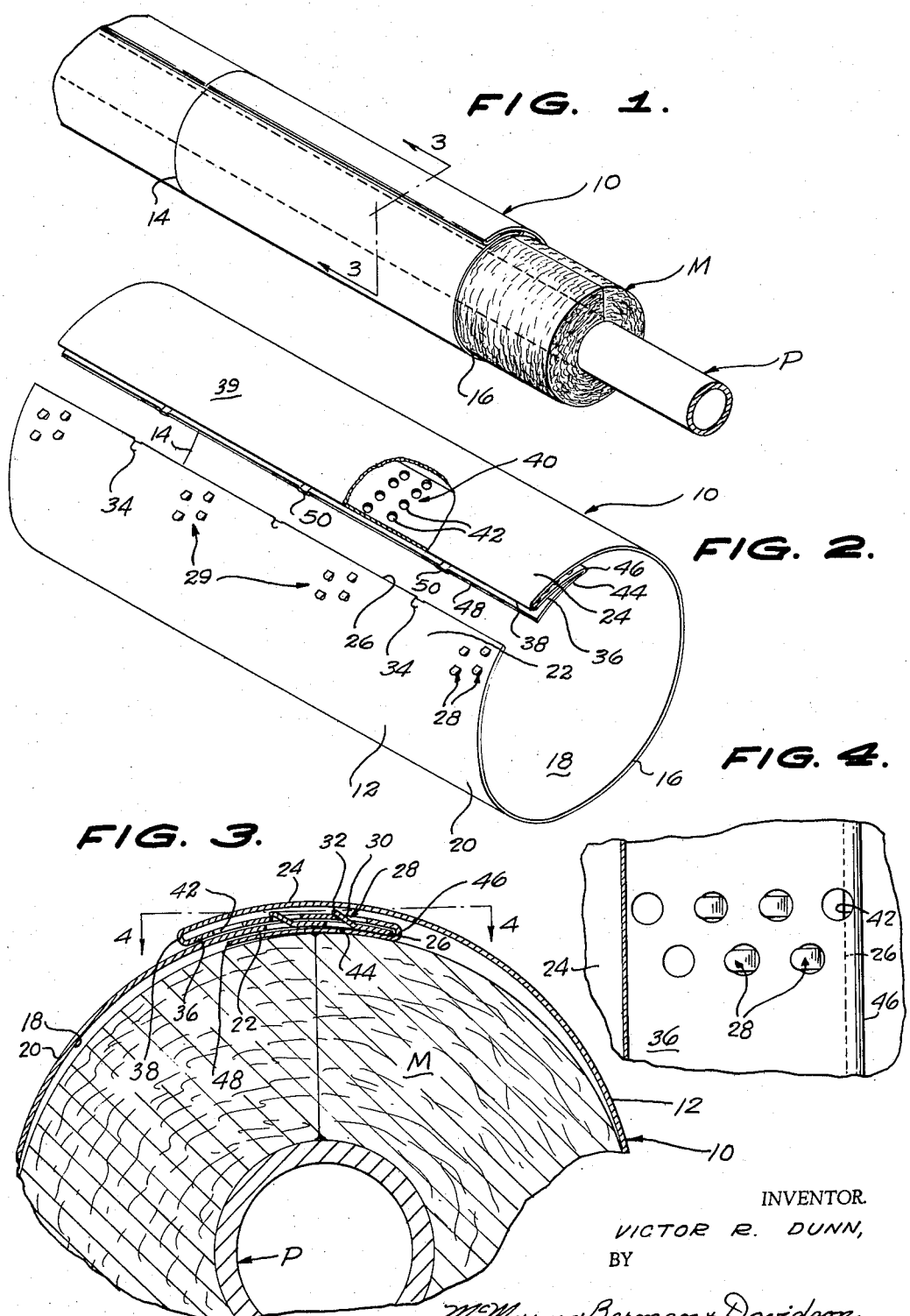

United States Patent Office 3,242,948
Patented Mar. 29, 1966

3,242,948
ADJUSTABLE PIPE JACKET
Victor R. Dunn, 3617 Youree Drive,
Shreveport, La.
Filed Nov. 29, 1963, Ser. No. 329,340
5 Claims. (Cl. 138—166)

This application is a continuation-in-part of my copending application, Serial No. 274,222, filed April 19, 1963, now abandoned.

This invention relates to pipe jackets, and more specifically, to improved pipe jacket constructions provided with variant forms of means for rapid installation with a minimum of handling and manipulation.

It has been previously known to supply sections of metallic jacketing for use in covering insulated pipe, but the construction of such previously known jacket sections, particularly as related to the mounting means therefor, has resulted in jacketing which is difficult to install and often impossible to dismantle without destruction thereof, and has resulted in jacketing requiring more than one person to mount and demount. A primary object of the present invention is therefore to provide pipe jacket constructions adapted for installation or removal by one mechanic without assistance, and which are securely positioned when in place.

An ancillary object is to provide pipe jacket constructions involving plural connection means, and having indicia thereon for alignment of the connection means.

Another object of importance resides in the provision of connection means employing the inherent resiliency of the jacket material in initial connection and in maintaining the connection.

General objectives include the provision of jacket constructions of the character identified above which are non-complex in construction and assembly, inexpensive to manufacture and sell, easily transported, and durable in use.

Other and further objects and advantages of the present invention will become apparent from a consideration of the following specification when read in conjunction with the annexed drawings, in which:

FIGURE 1 is a perspective view of insulated pipe having a first form of jacket constructed and assembled in accordance with the teachings of this invention in place thereon, the insulation and jacket being partially removed for illustration;

FIGURE 2 is an enlarged perspective view of a section of the jacket per se in disassembled condition;

FIGURE 3 is a fragmentary, enlarged, vertical cross sectional view, taken substantially along the section line 3—3 of FIGURE 1, looking in the direction of the arrows;

FIGURE 4 is an enlarged, fragmentary, sectional view along the section line 4—4 of FIGURE 3, looking in the direction of the arrows;

FIGURE 5 is a perspective view, partially broken away, showing a second form of jacket of the present invention;

FIGURE 6 is a fragmentary, enlarged, sectional view, showing the form of jacket of FIGURE 5 in place; and FIGURE 7 is a view of the connection means taken substantially on the line 7—7 of FIGURE 6, looking in the direction of the arrows.

This invention, in each of its forms, finds its environment of use in association with a pipe used, for example, to conduct fluid substances, a pipe of this type being indicated at P in FIGURES 1, 3, 6 and 9. In some instances, as for example, where the fluid is to be maintained at a given temperature or where condensation on the pipe P is to be avoided, the pipe P is covered with one or more layers of insulation material M often of a relatively soft, fibrous material of sufficient porosity to effectively limit the transfer of heat therethrough. To protect the insulation material M, to further insulate the pipe P, and for other purposes known in the art, it is desirable to provide a sheath or pipe jacket to encase the pipe P and the insulation M.

The first form of pipe jacket of this invention is generally identified by reference numeral 10 in FIGURES 1-4, and comprises a sheet or plate 12 of aluminum or the like, constituting a cover member of initially substantially rectangular form having ends 14, 16 and opposite inner and outer surfaces 18, 20. During fabrication, the sheet 12 is rolled to the form shown in FIGURE 2. The cover member or sheet 12 further includes a first side portion 22, and a second side portion 24.

The first side portion 22 includes a side edge 26. A plurality of struck tabs 28 are provided and are spaced inwardly from the edge 26, and arranged in longitudinal and transverse rows, in groups 29 wherein, as best seen in FIGURE 4, the tabs 28 are in staggered relation longitudinally, but are aligned transversely. Tabs 28 are outwardly struck in this form of the invention and project from the outer surface 20 in a direction away from the edge 26. As seen in FIGURE 3, the tabs have a main central portion 30 projecting angularly from the general extent of the surface 20, and slightly rebent outer end portion 32.

The first side portion 22, at locations spaced between the groups 29 of tabs 28 has indentations 34 or other suitable markings extending to its edge 26 for a purpose described in more detail below.

The second side portion 24 has a reverted section 36 bent rearwardly from a fold line 38 to underlie an imperforate top section 39, the section 36 being of a depth at least greater than the distance between the edge 26 of the first side portion 22 and the inward extent of the groups 29. The section 36 has formed therein a plurality of groups 40 of openings 42 arranged in rows—the openings of each group being horizontally staggered and vertically aligned as seen in FIGURE 4. The openings 42 of each group 40 are adapted to receive the tabs 28 and preferably exceed the number of tabs 28 in each vertical line of each group 29 thereof whereby means for variance in the location of connection between the side portions 22 and 24 is provided, thus allowing for variance in the diameter of the jacket 10.

The second side portion 24 further includes a rebent portion 44 secured, along fold line 46, to the section 36. The portion 44 is preferably imperforate to provide an underlying shield for the connection means, which is desirable in some instances, and terminates in an end edge 48 having indentations 50 or other markings thereon constituting indicia means between the groups 40 of openings 42.

Upon alignment of the indicia 34 and 50, the groups 29 and 40 are aligned. Thus, even in those instances wherein a very long jacket section 10 is supplied, proper positioning from a central location is possible.

Proceeding to the form of the invention shown in FIGURES 5-7, a second form of jacket 10a is therein disclosed, and elements similar to those hereinbefore described in the above form of the invention have similar numerals applied thereto, the letter "a" being added for distinction. The jacket 10a is comprised of a plate 12a of suitable material such as sheet metal, or the like, with ends including an end 16a, and opposite inner and outer faces 18a and 20a. Plate 12a, being rolled to generally circular form as shown in FIGURE 5 during fabrication of the jacket, includes adjacent first and second side portions 22a and 24a.

A terminal side edge 26a is provided along the first side portion 22a, and a plurality of inwardly struck tabs 28a are arranged in groups 29a transversely aligned, individual tabs being longitudinally staggered as in the first described form of the invention. The tabs 28a extend inwardly from the surface 18a, in a direction away from the edge 26a. Indentations 34a are provided at spaced locations along the edge 26a, and comprise indicia means for jacket alignment.

The second side portion 24a includes a reverted section 36a bent rearwardly from a forward fold line 38a, section 36a being of a depth to fit over the groups 29a, with the section 22a inserted therebetween. The reverted section 36a terminates at an inner fold line 46a which, as seen in FIGURE 6, is not sharply bent as is the fold line 38a, but rather is of arcuate or semi-circular form whereby it comprises an upstanding wall.

The fold 46a joins the section 36a to an underlying rebent portion 44a terminating in end edge 48a underlying the fold 38a and carrying indicia such as indentations 50a for alignment with the indentations 34a.

The rebent portion 44a has plural groups 40a of circular openings 42a formed therein, the groups being arranged such that, upon alignment with the tab groups 29a, the tabs enter the openings. The openings 42a exceed the tabs in number to provide a means for adjustment of the diameter of the finished assembly. The groups of tabs and openings are readily aligned by previous alignment of the indentations 34a and 50a.

In use, the installation of the various forms of the invention involves the alignment of indicia 34 and 50, 34a and 50a followed by a manual thrust of the respective portions 22, 22a between the sections 36, 36a, and respective portions 44, 44a. A slight retrogressive movement of either of these portions causes the tabs 28, 28a to enter adjacent openings 42, 42a—the inherent resiliency of the sheets 12, 12a and the tendency thereof to resume the unconnected form serving to aid in maintaining the locked relation therebetween.

As seen in FIGURE 1, the sections of that form of the invention are secured in end-to-end relation in covering a pipe installation. This is also true of the other form of the invention hereinbefore described.

If release should be desired of the forms of the invention shown in FIGURES 1–7, inward pressure on the sections, followed by a lift applied along the fold line 38 or 38a disengages the tabs from the openings and causes disassembly.

Having described and illustrated two forms of this invention in some detail, it is to be understood that these descriptions and illustrations are offered merely by way of example, and that the invention is to limited in scope only by the appended claims.

What is claimed is:
1. A pipe jacket for use in encasing a pipe and insulation about the pipe, the jacket being of adjustable diameter and comprising:
   a cover member having interfitting first and second side portions, the first side portion including an edge;
   a plurality of tabs on the first side portion, the tabs being arranged in groups, and each group having its tabs disposed in rows substantially perpendicular to the edge, the rows of each group being staggered;
   the tabs extending angularly outward from the first side portion and including free outer end portions extending away from the edge of the first side portion;
   the second side portion of the cover member having an imperforate top section, a reverted section underlying the top section and of a depth at least equal to the depth of the first side portion, and a rebent section underlying the top and reverted sections connected to the reverted section by an interior wall;
   the sections underlying the imperforate top section having plural opening means associated therewith, the opening means being grouped, whereby the rows of tabs are engageable with selected groups of the opening means to adjustably interlock the first side portion and the second side portion with the first side portion encased within the second side portion and with all openings in the cover enclosed therein; and
   complementary indicia means on the first and second side portions for alignment of the tabs and opening means.
2. The invention as defined in claim 1, wherein:
   the opening means comprise openings formed in the reverted section releasably engaged by the tabs.
3. The invention of claim 2, wherein:
   the number of openings of each group exceeds the number of tabs in a corresponding group.
4. The invention of claim 1, wherein:
   the opening means comprises plural groups of openings formed in the rebent section releasably engaged by the tabs.
5. The invention of claim 4, wherein:
   the number of openings of each group exceeds the number of tabs in a corresponding group.

References Cited by the Examiner

UNITED STATES PATENTS

| | | | |
|---|---|---|---|
| 293,831 | 2/1884 | Wickers | 24—206.1 |
| 325,672 | 9/1885 | Gray | 24—206.1 |
| 739,600 | 9/1903 | Heinig | 138—166 |
| 1,829,754 | 11/1931 | Miller | 138—166 |
| 2,201,409 | 5/1940 | Siebenlist | 138—166 |
| 2,936,980 | 5/1960 | Rapata | 24—206.1 |
| 3,007,602 | 11/1961 | Frank | 220—60 |

FOREIGN PATENTS 888,238  1/1962  Great Britain.

LAVERNE D. GEIGER, *Primary Examiner.*

H. ARTIS, *Assistant Examiner.*